US008488291B2

(12) United States Patent
Lien et al.

(10) Patent No.: US 8,488,291 B2

(45) Date of Patent: Jul. 16, 2013

(54) ZINC-OXIDE SURGE ARRESTER FOR HIGH-TEMPERATURE OPERATION

(75) Inventors: Ching-Hohn Lien, Taipei (TW); Jie-An Zhu, Shanghai (CN); Zhi-Xian Xu, Guishan Shiang (TW); Xing-Xiang Huang, Guishan Shiang (TW); Ting-Yi Fang, Guishan Shiang (TW)

(73) Assignee: SFI Electronics Technology Inc. (TW)

( * ) Notice: Subject to any disclaimer, the term of this patent is extended or adjusted under 35 U.S.C. 154(b) by 168 days.

(21) Appl. No.: 13/023,624

(22) Filed: Feb. 9, 2011

(65) Prior Publication Data

US 2012/0057265 A1 Mar. 8, 2012

(30) Foreign Application Priority Data

Sep. 3, 2010 (TW) .............................. 99129977 A

(51) Int. Cl.
*H02H 1/00* (2006.01)

(52) U.S. Cl.
USPC .......................................................... 361/126

(58) Field of Classification Search
USPC .......................................................... 361/126
See application file for complete search history.

(56) References Cited

U.S. PATENT DOCUMENTS

| | | | | | |
|---|---|---|---|---|---|
| 4,153,921 | A * | 5/1979 | Kresge et al. | ................... | 361/40 |
| 4,218,721 | A * | 8/1980 | Stetson | .......................... | 361/117 |
| 4,400,683 | A * | 8/1983 | Eda et al. | ......................... | 338/21 |
| 5,294,908 | A * | 3/1994 | Katsumata et al. | ............. | 338/21 |
| 5,854,586 | A * | 12/1998 | McMillan et al. | .............. | 338/21 |
| 6,538,318 | B2 * | 3/2003 | Nagareda et al. | ............. | 257/703 |
| 2010/0117271 | A1 * | 5/2010 | Lien et al. | ..................... | 264/614 |

* cited by examiner

*Primary Examiner* — Stephen W Jackson
*Assistant Examiner* — Angela Brooks
(74) *Attorney, Agent, or Firm* — Bacon & Thomas, PLLC

(57) ABSTRACT

A ZnO surge arrester for high-temperature operation is characterized in that a grain boundary layer between ZnO grains thereof contains a $BaTiO_3$-based positive temperature coefficient thermistor material, which takes 10-85 mol % in the overall grain boundary layer, and when operating temperature raises, the positive temperature coefficient thermistor material in the grain boundary layer has its resistance sharply increasing with the raising temperature, so as to compensate or partially compensate decrease in resistance of components in the grain boundary layer caused by the raising temperature, thereby making the resistance of the grain boundary layer in the ZnO surge arrester more independent of temperature. The ZnO surge arrester thus is suitable for operation where a maximum operating temperature is higher than 125° C., or even higher than 150° C.

7 Claims, 1 Drawing Sheet

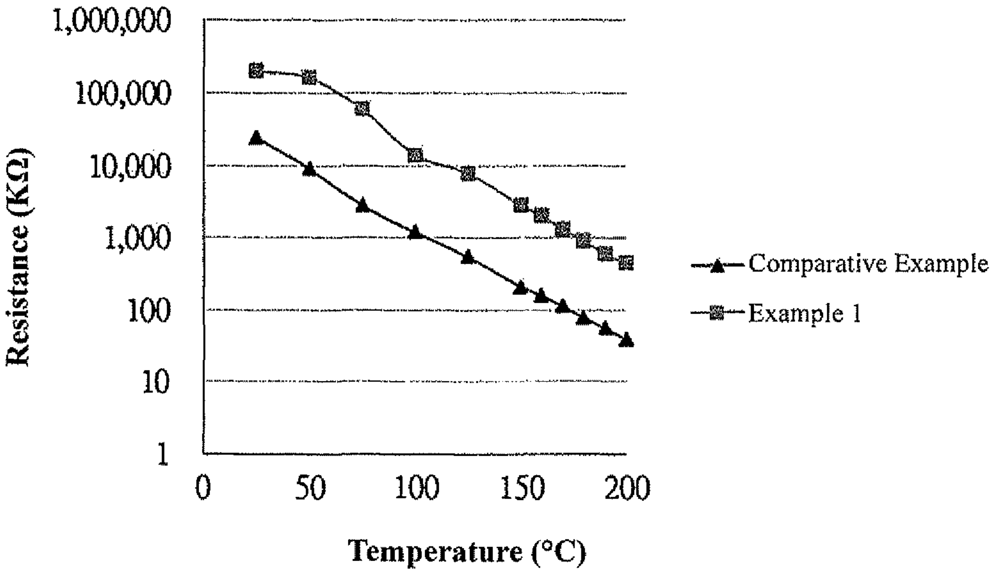
1,000,000
100,000
10,000
1,000
100
10
1
Resistance (KΩ)
0
50
100
150
200
Temperature (°C)
Comparative Example
Example 1

ZINC-OXIDE SURGE ARRESTER FOR HIGH-TEMPERATURE OPERATION

BACKGROUND OF THE INVENTION

1. Field of the Invention

The present invention relates to zinc-oxide surge arresters, and more particularly, to a ZnO surge arrester applicable to operation where the maximum operating temperature is higher than 125° C.

2. Description of Prior Art

ZnO surge arrester is an impedance element whose resistance varies non-linearly with voltages, and is mainly made of zinc oxide powder sintered with metallic oxide additives, such as $Bi_2O_3$, $Sb_2O_3$, CaO, $Cr_2O_3$, $Co_2O_3$ and MnO, into sintered ceramic at high temperature. For enhancing the sintering properties of the material, a small amount of $SiO_2$ may be also added.

Such a ZnO surge arrester possesses excellent non-ohmic characteristics and good capability of surge absorption, while having a desirable nonlinear I-V characteristic curve. Since its resistance is high when the voltage is low, and when the voltage is high, its resistance decreases sharply, it is also referred to as a varistor.

ZnO surge arresters are often used to protect electronic circuits from damage or interference caused by excessively high transient voltages. In normal operational conditions, a surge arrester staying standby presents high impedance (megohms) with respect to the electronic components it protects, and thus forces currents to proceed along the designed path instead of passing therethrough, thereby maintaining the circuit properties as designed. In case of a transient voltage surge that is higher than the breakdown voltage of the surge arrester, the surge arrester has its impedance lowered to a few ohms, so as to allow the surge voltage to pass therethrough in a short-circuit-like state, and thereby shunt the current to ground elements, thereby protecting electronic products or expensive circuit components from being damaged by the surge.

Those surge arresters applied to common information products for the purposes of voltage stabilization and surge absorption typically endure a maximum operating temperature up to about 85° C. However, with the fast development of electronic products and communication products, the requirements for heat resistance of surge arresters are becoming stricter. For example, surge arresters applied to electronic circuits of ABS (Antilock Brake System), airbags or power steering wheels for automobiles have to work in an operating temperature higher than 125° C., or even higher than 150° C. Nevertheless, in the state-of-the-art technology, there has not been any ZnO surge arrester capable of working at 150° C. proposed.

In addition, in the sintered ceramic of the existing ZnO surge arresters, the grain boundary layer between ZnO grains is typically made of NTC (Negative Temperature Coefficient) thermistor materials whose resistance reduces with raising temperature, and when the working temperature of the existing ZnO surge arresters raises, the current carriers in the materials of the grain boundary layer of the existing ZnO surge arresters move in a higher mobility. With the impact of the working voltage, the existing ZnO surge arrester shows a decrease in breakdown voltage, resistance and nonlinear exponent, and an increase in leakage current, thus deteriorating. Consequently, the ZnO surge arrester can be burned out.

Hence, it is desired to have a ZnO surge arrester applicable in an operating temperature higher than 125° C. The present invention thus proposes a solution that is to add a PTC (Positive Temperature Coefficient) thermistor material in the grain boundary layer between ZnO grains in a ZnO surge arrester, so that when the working temperature raises, the PTC thermistor material has its resistance sharply increased for compensating or partially compensating the resistance of the traditional materials in the grain boundary layer reduced due to the increased temperature. Thereby, the grain boundary layer in the ZnO surge arrester can have its resistance more independent of temperature, so as to significantly improve the ZnO surge arrester in capability of enduring high-temperature operation.

SUMMARY OF THE INVENTION

To this end, one primary objective of the present invention is to disclose a ZnO surge arrester for high-temperature operation, wherein in manufacturing thereof, a PTC (Positive Temperature Coefficient) thermistor material is added to a grain boundary layer between ZnO grains in the ZnO surge arrester for mutual resistance-temperature offset between negative temperature coefficient thermistor materials and the PTC thermistor material in the grain boundary layer. When the operating temperature raises, the PTC thermistor material has its resistance sharply increased, so as to compensate or partially compensate the reduced resistance of the NTC thermistor materials in the grain boundary layer taken away by the increased temperature, thereby preventing the ZnO surge arrester from having increased leakage current and decreased breakdown voltage under high working voltage. Particularly, in an operating temperature higher than 125° C. or higher than 150° C., the ZnO surge arrester is ensured with normal operation.

Another primary objective of the present invention is to disclose a ZnO surge arrester for high-temperature operation, which has a sintered ceramic structure composed of ZnO grains and a grain boundary layer between the ZnO grains, wherein the grain boundary layer contains a PTC (Positive Temperature Coefficient) thermistor material, so that the ZnO surge arrester remains operating normally even in an operating temperature higher than 150° C.

The positive temperature coefficient thermistor material is selected from the group consisting of polycrystalline, vitrescent $BaTiO_3$ or $BaTiO_3$-depoed $SrTiO_3$.

The positive temperature coefficient thermistor material may include rare earth ions that allow semiconductor transformation and adjustment of the Curie point (or the Curie temperature). The rare earth ions include one or more selected from the group consisting of $Li^{+1}$, $Ca^{+2}$, $Mg^{+2}$, $Sr^{+2}$, $Ba^{+2}$, $Sn^{+4}$, $Mn^{+4}$, $Si^{+4}$, $Zr^{+5}$, $Nb^{+5}$, $Al^{+3}$, $Sb^{+3}$, $Bi^{+3}$, $Ce^{+3}$, and $La^{+3}$.

The positive temperature coefficient thermistor material takes 10-85 mol % in the grain boundary layer.

BRIEF DESCRIPTION OF THE DRAWING

FIG. 1 graphically shows resistance variation of Example 1 and Comparative Example 1 of the present invention under different temperatures.

DETAILED DESCRIPTION OF THE INVENTION

The present invention provides a ZnO surge arrester that is made through the conventional high-temperature ceramic sintering process, and may be of the disc type, the chip type or the ring type, while possessing both rheostatic and surge-absorbing properties and being applicable to high-temperature operation.

The ZnO surge arrester of the present invention includes a sintered ceramic, which endures high temperature for having a PTC (Positive Temperature Coefficient) thermistor material in a grain boundary layer between ZnO grains, wherein the PTC thermistor material takes 10-85 mol % in the grain boundary layer.

Therein, the ZnO grains of the sintered ceramic are formed by ZnO powder or ZnO doped with metallic oxide additives such as $Bi_2O_3$, $Sb_2O_3$, CaO, $Cr_2O_3$, $Co_2O_3$ or MnO through sintering. The disclosed ZnO surge arrester has its sintered ceramic preferably containing 97 mol/% of ZnO grains. In addition, the weight ratio between the ZnO grains in the sintered ceramic and the sintering charge or glass powder in the sintered grain boundary layer is 100:2-100:30.

The PTC (Positive Temperature Coefficient) thermistor material in the grain boundary layer is selected from the group consisting of polycrystalline, vitrescent $BaTiO_3$ or $BaTiO_3$-depoed $SrTiO_3$.

$BaTiO_3$ is an oxide based on barium and titanium and may be made from $BaCO_3$ and titania. Similarly, $SrTiO_3$ may be made from $SrCO_3$ and titania. In addition, for facilitating semiconductor transformation and for setting a temperature threshold (i.e. Curie point or Curie temperature) where the resistance of the post-sintering PTC thermistor material significantly increases, rare earth ions that allow semiconductor transformation and adjustment of the Curie point (or the Curie temperature) may be added. The rare earth ions include one or more selected from the group consisting of $Li^{+1}$, $Ca^{+2}$, $Mg^{+2}$, $Sr^{+2}$, $Ba^{+2}$, $Sn^{+4}$, $Mn^{+4}$, $Si^{+4}$, $Zr^{+5}$, $Nb^{+5}$, $Al^{+3}$, $Sb^{+3}$, $Bi^{+3}$, $Ce^{+3}$ and $La^{+3}$.

Since the grain boundary layer between the ZnO grains of the ZnO surge arrester contains the $BaTiO_3$-based PTC thermistor material, when the operating temperature raises, the resistance of the $BaTiO_3$-based component in the grain boundary layer sharply increases, so as to compensate or partially compensate the reduced part of the resistance of negative temperature coefficient (NTC) thermistor material in the grain boundary layer caused by the increased temperature. Such temperature-resistance mutual offset ensures the ZnO surge arrester not having increased leakage current and decreased breakdown voltage in high-temperature operation. Therefore, in operation whose maximum operating temperature is higher than 125° C. or higher than 150° C., such as between 160° C. and 180° C., the ZnO surge arrester remains operating normally and is free from the risk of local thermal breakdown or melting down.

Some examples will be described below for demonstrating the ZnO surge arrester of the present invention is applicable to high-temperature operation. However, the scope of the present invention is not limited to the given examples.

Example 1

1. The material for the grain boundary layer between the ZnO grains of the ZnO surge arrester was prepared by using the chemical coprecipitation method. The composition and ratios of components in the grain boundary layer are shown in the table below:

| | Component | | | | | | | |
|---|---|---|---|---|---|---|---|---|
| | $Bi_2O_3$ | $Sb_2O_3$ | MnO | $Co_2O_3$ | $SiO_2$ | BaO | $SnO_2$ | $TiO_2$ |
| mol % | 1 | 1 | 1 | 1 | 1 | 2.2 | 0.9 | 3.1 |

According to theoretical calculation, the $BaTiO_3$-based PTC thermistor material for the ZnO surge arrester of this Example takes 55.4 mol % in the overall grain boundary layer.

2. The precipitate was washed and mixed well with purified water. Then ZnO powder was added in a ratio of about 20:100 (by weight) and mixed to uniformity. The mixture was dried at 230° C. and then baked at 760° C. for 3 hours. The powder as a product of baking was ground to particles with an average diameter smaller than 2 microns.

3. An 8-layer printed inner electrode was made through the conventional technology for making multilayer varistors, and then sintered to produce a multilayer varistor of Specification 1812. The electric properties of the resultant multilayer varistor were measured under different temperatures and shown in Table 1, and its resistance is reflected in FIG. 1.

TABLE 1

| electric properties under different temperatures | | | | | | | | |
|---|---|---|---|---|---|---|---|---|
| | Positive | | | | Negative | | | |
| Temperature ° C. | Breakdown Voltage (V1mA) | Non-Linear Coefficient (α) | $I_L$ (μA) | Resistance (MΩ) | Breakdown Voltage (V1mA) | Non-Linear Coefficient (α) | $I_L$ (μA) | |
| 25 | 48.11 | 36.69 | 3.4 | >200.00 | 48.21 | 38.15 | 3.3 | |
| 50 | 48.23 | 37.10 | 3.9 | 163.00 | 48.33 | 38.60 | 3.8 | |
| 75 | 48.53 | 38.65 | 8.9 | 59.00 | 48.40 | 39.50 | 8.7 | |
| 100 | 48.80 | 38.80 | 14.0 | 13.80 | 48.90 | 39.70 | 15.0 | |
| 125 | 48.90 | 36.60 | 19.6 | 7.80 | 48.93 | 37.80 | 19.1 | |
| 150 | 49.10 | 28.10 | 41.9 | 2.80 | 49.30 | 29.00 | 43.0 | |
| 160 | 49.20 | 25.50 | 56.9 | 2.00 | 49.32 | 25.40 | 57.1 | |
| 170 | 49.30 | 18.40 | 77.1 | 1.30 | 49.40 | 18.10 | 77.6 | |
| 180 | 49.30 | 11.20 | 99.2 | 0.90 | 49.40 | 11.30 | 101.2 | |
| 190 | 49.25 | 7.36 | 131.9 | 0.60 | 49.40 | 7.35 | 131.0 | |
| 200 | 49.08 | 4.39 | 168.9 | 0.44 | 49.30 | 4.50 | 171.1 | |
| Cool to 25° C. | 48.23 | 36.89 | 3.3 | >200.00 | 48.40 | 38.10 | 3.3 | |

According to Table 1, the multilayer varistor of this Example presented very high non-linear coefficient α and low leakage current up to 160° C. The results demonstrate that the multilayer varistor of this Example endured the operating temperature up to 160° C.

Example 2

1. The material for the grain boundary layer between the ZnO grains of the ZnO surge arrester was prepared by using the sol-gel method. The composition and ratios of components in the grain boundary layer are shown in the table below:

| | Component | | | | | | | | | |
|---|---|---|---|---|---|---|---|---|---|---|
| | BaO | $Ce_2O_3$ | SrO | $SnO_2$ | $TiO_2$ | $B_2O_3$ | $Bi_2O_3$ | $SiO_2$ | $Sb_2O_3$ | $Co_2O_3$ |
| mol % | 1 | 0.005 | 0.5 | 0.095 | 1.7 | 3 | 1.3 | 1.9 | 1 | 1 |

According to theoretical calculation, the $BaTiO_3$-based PTC thermistor material for the ZnO surge arrester of this Example takes 28.7 mol % in the overall grain boundary layer.

2. The obtained gel was dried at 230° C. to dry powder that was later grounded. The grounded powder was washed by purified water for five times and then dried. ZnO powder was added into the dried powder in a ratio of about 20:100 (by weight) and mixed to uniformity with purified water. The mixture was dried at 230° C. and then baked at 760° C. for 3 hours. The powder as a product of baking was ground to particles with an average diameter smaller than 2 microns.

3. The powder such prepared was compacted into a round cake sized 8 mm×1 mm. The cake was sintered into a disc-type varistor. The electric properties of the disc-type varistor were measured at different temperatures and shown in Table 2.

TABLE 2

| electric properties under different temperatures | | | | | | | |
|---|---|---|---|---|---|---|---|
| | Positive | | | | Negative | | |
| Temperature ° C. | Breakdown Voltage (V1mA) | Non-Linear Coefficient (α) | $I_L$ (μA) | Resistance (MΩ) | Breakdown Voltage (V1mA) | Non-Linear Coefficient (α) | $I_L$ (μA) |
| 25 | 1078 | 64.22 | 8.8 | >200 | 1084 | 62.89 | 8.5 |
| 50 | 1078 | 64.22 | 6.6 | >200 | 1083 | 61.27 | 5.3 |
| 75 | 1078 | 64.22 | 7.3 | >200 | 1083 | 59.73 | 6.0 |
| 100 | 1079 | 61.12 | 8.3 | >200 | 1082 | 61.27 | 8.8 |
| 125 | 1079 | 59.59 | 13.6 | >200 | 1081 | 58.17 | 13.2 |
| 150 | 1078 | 52.88 | 24.0 | 120 | 1080 | 53.02 | 22.9 |
| 175 | 1076 | 37.00 | 43.4 | 61 | 1077 | 37.00 | 44.9 |
| 190 | 1073 | 22.47 | 66.6 | 26 | 1075 | 21.18 | 67.9 |
| 200 | 1071 | 13.71 | 91.6 | 11 | 1071 | 13.64 | 88.4 |
| Cool to 25° C. | 1078 | 64.34 | 8.5 | >200 | 1083 | 63.17 | 8.7 |

According to Table 2, the disc-type varistor of this Example presented very high non-linear coefficient α and low leakage current up to 175° C. The results demonstrate that the disc-type varistor of this Example endured the operating temperature up to 175° C.

Comparative Example

1. The material for the grain boundary layer between the ZnO grains of the ZnO surge arrester was prepared by using the chemical coprecipitation method. The composition and ratios of components in the grain boundary layer are shown in the table below:

| Component | $Bi_2O_3$ | $Sb_2O_3$ | MnO | $Co_2O_3$ | $SiO_2$ |
|---|---|---|---|---|---|
| mol % | 1 | 1 | 1 | 1 | 1 |

2. The precipitate was washed and mixed well with purified water. Then ZnO powder was added in a ratio of about 20:100 (by weight) and mixed to uniformity. The mixture was dried at 230° C. and then baked at 760° C. for 3 hours. The powder as a product of baking was ground to particles with an average diameter smaller than 2 microns.

3. An 8-layer printed inner electrode was made through the conventional technology for making multilayer varistors, and then sintered to produce a multilayer varistor of Specification 1812. The electric properties of the resultant multilayer varistor were measured under different temperatures and shown in Table 3, and its resistance is reflected in FIG. 1.

TABLE 3 electric properties under different temperatures

| | Positive | | | | Negative | | |
|---|---|---|---|---|---|---|---|
| Temperature ° C. | Breakdown Voltage (V1mA) | Non-Linear Coefficient (α) | $I_L$ (μA) | Resistance (MΩ) | Breakdown Voltage (V1mA) | Non-Linear Coefficient (α) | $I_L$ (μA) |
| 25 | 44.91 | 23.98 | 36.2 | 24.000 | 44.81 | 24.01 | 35.9 |
| 50 | 44.57 | 19.90 | 51.0 | 9.000 | 44.43 | 20.10 | 49.0 |
| 75 | 44.47 | 9.15 | 114.0 | 2.760 | 44.51 | 9.25 | 109.0 |
| 100 | 43.80 | 5.60 | 192.0 | 1.180 | 43.70 | 5.50 | 188.0 |
| 125 | 42.60 | 3.70 | 302.0 | 0.540 | 42.40 | 3.70 | 300.0 |
| 150 | 38.90 | 2.54 | 452.0 | 0.210 | 38.90 | 2.55 | 462.0 |
| 160 | 37.00 | 2.20 | 499.0 | 0.158 | 37.30 | 2.10 | 507.0 |
| 170 | 34.20 | 1.90 | 550.0 | 0.111 | 34.50 | 1.90 | 554.0 |
| 180 | 31.20 | 1.70 | 586.0 | 0.078 | 31.60 | 1.70 | 587.0 |
| 190 | 27.80 | 1.45 | 617.0 | 0.055 | 27.90 | 1.51 | 613.0 |
| 200 | 24.50 | 1.34 | 657.0 | 0.039 | 24.60 | 1.33 | 660.0 |
| Cool to 25° C. | 44.88 | 24.35 | 35.5 | 25.000 | 44.88 | 24.12 | 36.0 |

CONCLUSION

1. Comparative Example demonstrates that without the $BaTiO_3$-based component in the grain boundary layer between ZnO grains of the ZnO surge arrester, the ZnO surge arrester presented a sharp decline in resistance, an increase in leakage current and a reduction in non-linear coefficient α when the temperature was raising. When the temperature reached 100° C., the breakdown voltage was decreased and the non-linear coefficient α was sharply reduced, causing the ZnO surge arrester to fail to work.

2. By comparing Example 1 and Example 2, it is learned that as long as the grain boundary layer of the ZnO surge arrester contains the $BaTiO_3$-based component, either polycrystalline or vitrescent one, the operating temperature of the ZnO surge arrester can be increased to 160° C.

By adding $BaTiO_3$ to the grain boundary layer of a ZnO surge arrester, the heat resistance of the ZnO surge arrester can be improved because the added the $BaTiO_3$-based component having the PTC properties can have its resistance sharply increased with the raising temperature and such increase can offset the resistance decrease of the negative temperature coefficient materials in the grain boundary layer caused by temperature rise.

Hence, at the same temperature, the resistances of the ZnO surge arresters of Example 1 and Example 2 are higher than that of the ZnO surge arrester without addition of $BaTiO_3$, so the former ones are suitable for high-temperature operation.

3. As to Example 1, when the temperature was 200° C., the breakdown voltage of the ZnO surge arrester stayed high. When the temperature was 180° C., the non-linear coefficient α remained greater than 10. As to Example 2, when the temperature was 200° C., the non-linear coefficient α of the ZnO surge arrester remained greater than 10, so the ZnO surge arrester remained working as a varistor. Therefore, the ZnO surge arresters of Example 1 and Example 2 are very suitable for an operating environment of an operating temperature higher than 150° C.

What is claimed is:

1. A ZnO surge arrester for high-temperature operation, comprising a sintered ceramic composed of 97 mol % of ZnO grains, and a grain boundary layer between the ZnO grains, wherein the grain boundary layer contains a PTC (Positive-Temperature-Coefficient) thermistor material selected from the group consisting of polycrystalline, vitrescent, $BaTiO_3$ or $BaTiO_3$-doped $SrTiO_3$ in an amount of 28.7 mol % to 55.4 mol % based on the grain boundary layer.

2. The ZnO surge arrester of claim 1, wherein a weight ration between the ZnO grains and the grain boundary layer is 100:2-100:30.

3. The ZnO surge arrester of claim 2, wherein the $BaTiO_3$ is doped by ions of one or more elements selected from the group consisting of $Li^{+1}$, $Ca^{+2}$, $Mg^{+2}$, $Sr^{+2}$, $Ba^{+2}$, $Sn^{+4}$, $Mn^{+4}$, $Si^{+4}$, $Zr^{+5}$, $Nb^{+5}$, $Al^{+3}$, $Sb^{+3}$, $Bi^{+3}$, $Ce^{+3}$ and $La^{+3}$.

4. The ZnO surge arrester of claim 1, wherein the $BaTiO_3$ is doped by ions of one or more elements selected from the group consisting of $Li^{+1}$, $Ca^{+2}$, $Mg^{+2}$, $Sr^{+2}$, $Ba^{+2}$, $Sn^{+4}$, $Mn^{+4}$, $Si^{+4}$, $Zr^{+5}$, $Nb^{+5}$, $Al^{+3}$, $Sb^{+3}$, $Bi^{+3}$, $Ce^{+3}$ and $La^{+3}$.

5. The ZnO surge arrester of claim 1, wherein the ZnO surge arrester has a maximum operating temperature ranging between 125° C. and 180° C.

6. The ZnO surge arrester of claim 1, wherein the ZnO surge arrester has a maximum operating temperature ranging between 150° C. and 180° C.

7. The ZnO surge arrester of claim 1, wherein the ZnO surge arrester has a maximum operating temperature ranging between 160 and 180° C.

* * * * *